United States Patent [19]

Wehle

[11] Patent Number: 4,693,735

[45] Date of Patent: Sep. 15, 1987

[54] MOTOR-DRIVEN TOOL HAVING AN AIR FILTER

[75] Inventor: Anton Wehle, Fellbach, Fed. Rep. of Germany

[73] Assignee: Andreas Stihl, Waiblingen, Fed. Rep. of Germany

[21] Appl. No.: 943,793

[22] Filed: Dec. 19, 1986

[30] Foreign Application Priority Data

Dec. 24, 1985 [DE] Fed. Rep. of Germany ....... 3546028

[51] Int. Cl.[4] ............................................. B01D 46/10

[52] U.S. Cl. .................................... 55/385 R; 30/381; 55/483; 55/500; 55/529

[58] Field of Search ............... 30/381, 382; 55/385 R, 55/385 B, 483, 487, 500, 529

[56] References Cited

U.S. PATENT DOCUMENTS

| | | | |
|---|---|---|---|
| 3,525,373 | 8/1970 | Kobayashi | 30/381 |
| 3,552,103 | 1/1971 | Smith | 55/529 X |
| 3,678,973 | 7/1972 | Loop | 55/385 R X |
| 3,680,608 | 8/1972 | Emmerich et al. | 30/381 |
| 3,698,455 | 10/1972 | Frederickson et al. | 55/385 R X |
| 3,994,067 | 11/1976 | Hazzard et al. | 55/385 R X |
| 4,010,544 | 3/1977 | Siman | 55/385 R X |
| 4,382,333 | 5/1983 | Nagashima et al. | 30/381 |
| 4,393,589 | 7/1983 | Barkhult | 30/381 |
| 4,594,083 | 6/1986 | Hiraizumi | 55/385 R |
| 4,626,266 | 12/1986 | Sasaki | 55/385 R |

FOREIGN PATENT DOCUMENTS

| | | | |
|---|---|---|---|
| 1027033 | 7/1983 | U.S.S.R. | 30/381 |

*Primary Examiner*—Robert Spitzer
*Attorney, Agent, or Firm*—Walter Ottesen

[57] ABSTRACT

An air filter for a motor-driven tool such as a portable motor-driven chain saw includes a prefilter through which aspirated air flows into a chamber partly defined by a cover that can be secured to the housing of the motor-driven tool. From this space, the air flows through a main air filter to the carburetor of the motor. The main air filter and the prefilter are configured as a one-piece double filter unit.

13 Claims, 3 Drawing Figures

MOTOR-DRIVEN TOOL HAVING AN AIR FILTER

FIELD OF THE INVENTION

The invention relates to a motor-driven tool such as a portable motor-driven chain saw, having a prefilter and a main air filter in which the aspirated air first passes through the prefilter and flows into a chamber partly defined by a cover attached to the housing of the motor-driven tool, and from there flows through the main air filter to the carburetor of the motor.

BACKGROUND OF THE INVENTION

In some conventional chain saws, it is known to provide a prefilter and a main air filter. The prefilter has the task of filtering out coarse particles of dirt even before they reach the main air filter. The prefilter is located in a recess of a cover closing off the carburetor body, or what is known as the carburetor cover. The main air filter is located inside the carburetor casing or the housing of the handle of the chain saw and is secured by means of threaded fasteners. This known embodiment has the disadvantage that the prefilter and the main air filter are embodied and disposed as two separate parts. For cleaning the filter, the cover with the prefilter must first be removed. Then the main air filter has to be unscrewed from the housing.

When cleaning operations are done, it repeatedly happens that the user devotes his primary attention only to the cleaning of the main air filter, setting the cover with the prefilter attached thereto aside and paying no attention to it, and so does not clean it; furthermore, he may even lay the prefilter on the ground, so that it becomes contaminated with dirt, clay, leaves or the like, so that despite the cleaning of the main air filter, the filtering effect when the motor-driven tool is put back together again remains greatly impaired because the prefilter is still dirty. When the chain saw is used continuously, for instance, during forestry work, daily cleaning of the filter is prescribed because the output of the internal combustion engine is dependent on the degree of cleanliness of the filter. This means that if the user forgets to clean the prefilter, there are considerable losses in engine capacity. A further disadvantage is that overall disassembly, cleaning and reassembly of the individual separate filters is inconvenient. Furthermore, manufacture is labor-intensive and costly because the prefilter and the main air filter must be manufactured as separate parts and must be provided with separate fastenings.

SUMMARY OF THE INVENTION

It is an object of the invention to provide a motor-driven tool having a prefilter and main air filter such that the user of the tool does not overlook to clean the prefilter when cleaning the main air filter. It is a further object of the invention to provide a simpler assembly and disassembly as well as a more favorable manufacture.

These objects are attained in accordance with a feature of the invention by configuring the main air filter and the prefilter as a one-piece double-filter unit.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
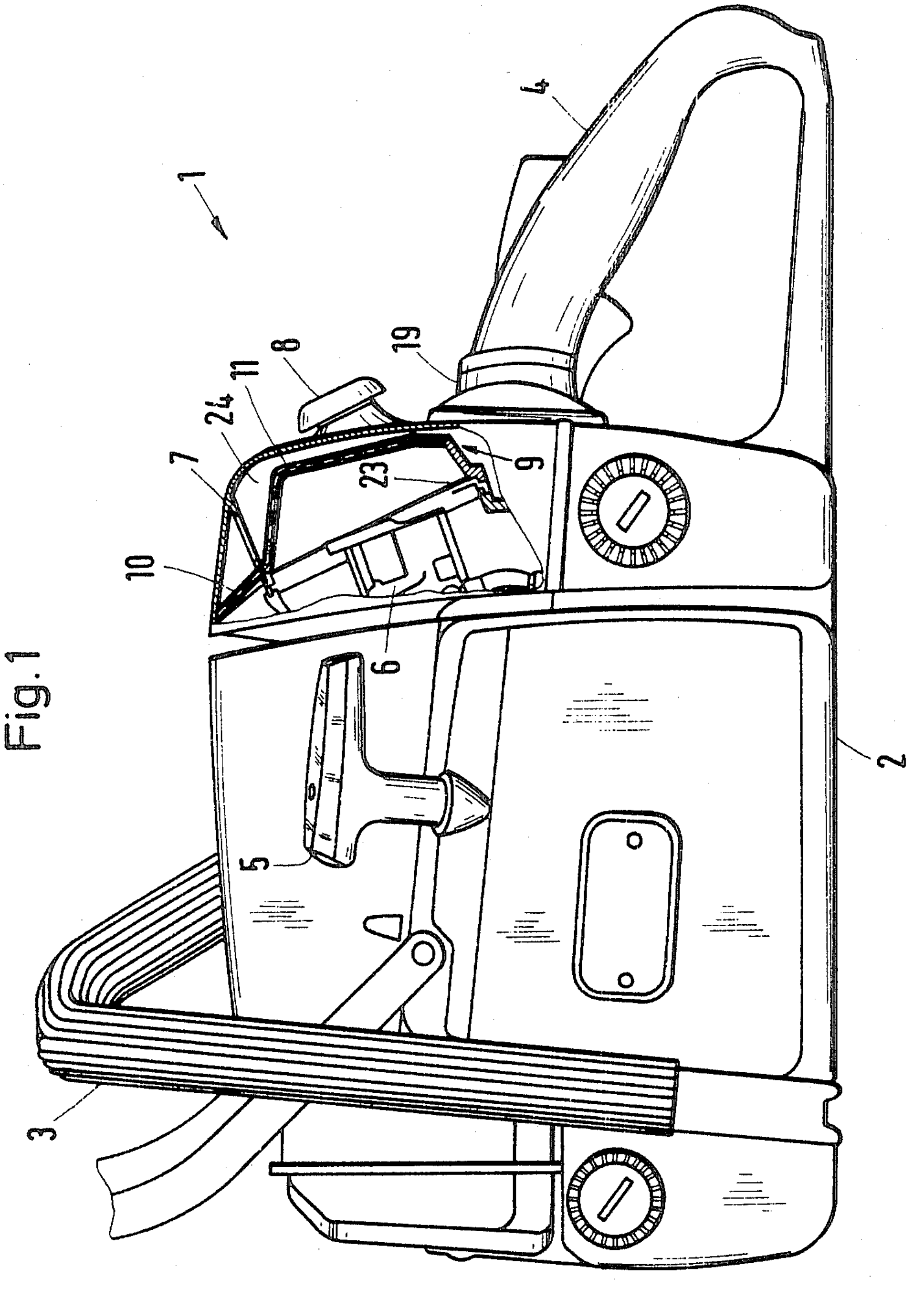
FIG. 1 is a side elevation view of the power head of a chain saw according to the invention with a portion of the housing broken away to show a section view of the air filter device.

The motor-driven chain saw 1 shown in the drawing has a housing 2 with a front handle 3 and a rear handle 4. The chain saw 1 has a saw bar (not shown) on which a revolving saw chain is guided. The saw chain is driven by an internal combustion engine located in the housing 2. The engine can be started via a pull 5.

Figure 2:
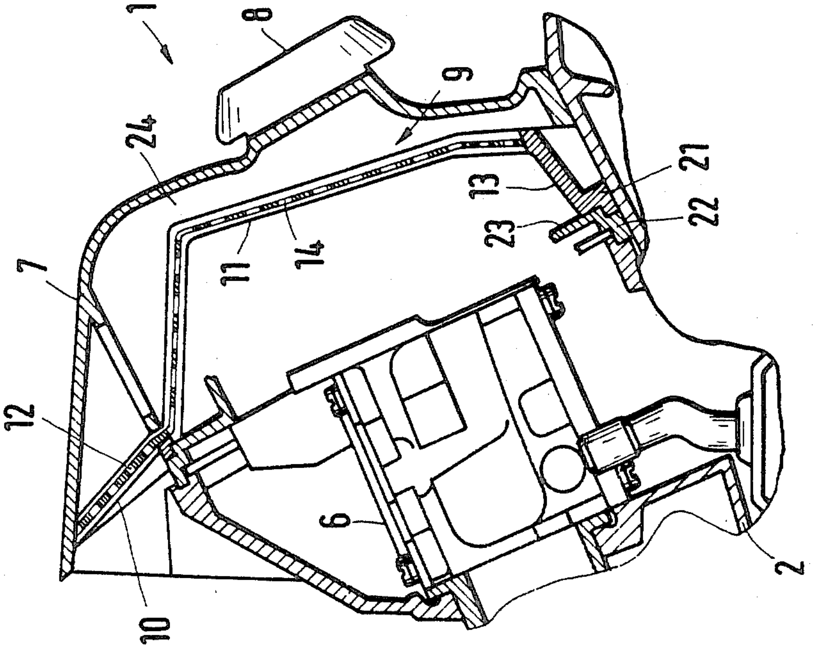
FIG. 2 is an enlarged illustration of the section view of the air filter device shown at the cutaway region of FIG. 1; and, FIG. 3 is a plan view of the air filter mounted in the chain saw shown in FIGS. 1 and 2.

In the housing 2, on the right as seen in FIG. 2 and next to the engine, there is a carburetor 6, which is shielded by a hood-like cover 7. The cover 7 is detachably secured to the housing 2 by means of a turn-lock fastener 8.

In the vicinity of the outward bulge of the cover 7, there is a one-piece double-filter unit 9, which has a prefilter 10 and a main air filter 11. The main air filter 11 is configured in hood-like fashion, similarly to the cover 7, and extends over the carburetor 6, being spaced apart therefrom. The prefilter 10 immediately adjoining the main air filter 11 is not curved, but rather is substantially flat and rests with its filter screen 12 approximately in the same plane as the frame 13 of the double filter unit 9, the frame 13 surrounding both the main air filter 11 and the prefilter 10.

The filter material 14, which may preferably be a wire mesh, that belongs to the main air filter 11 is configured with a substantially closer mesh than the filter screen 12 of the prefilter 10. To assure that the double-filter unit 9 has a high mechanical strength, capable in particular of withstanding filter cleaning, a support lattice 15 is provided, which divides both the filter material 14 of the main air filter 11 and the preferably metal filter screen 12 of the prefilter 10 into individual surface sections 16.

Figure 3:
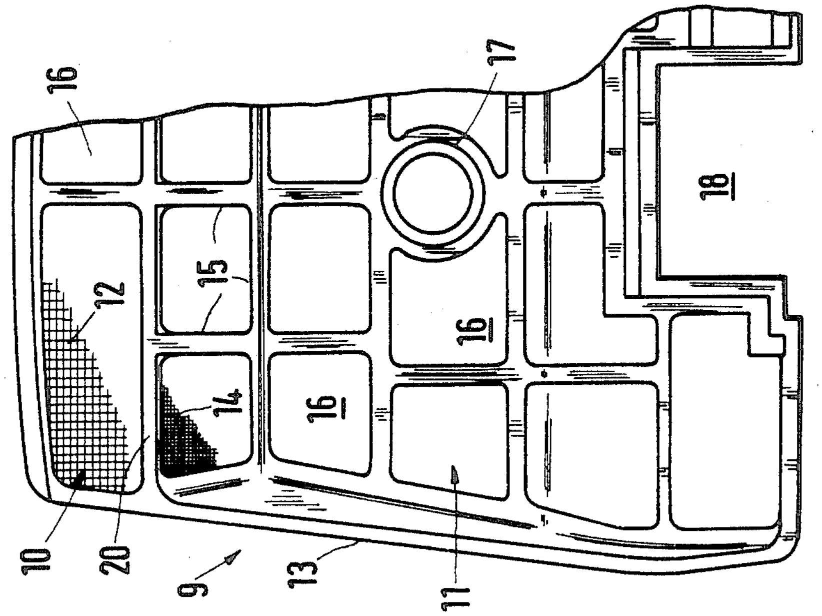

As FIG. 3 shows, a fastening element 17 of circular-like shape is provided approximately in the middle region of the main air filter 11 on the support lattice 15; by way of this fastening element 17, the double-filter unit 9 can be detachably secured to the housing 2 by means of a single screw or the like. For example, a threaded stud can be mounted on the housing 2 to threadably engage fastening element 17.

FIG. 3 also shows that the double-filter unit 9 has a rectangular recess 18 on the lower part of the frame 13. The recess 18 is provided in the main air filter 11 below the fastening element 17 and accommodates therein one end portion 19 of the handle 4 which is integrally molded to the housing 2.

In the embodiment shown in the drawing, the frame 13 of the double filter unit 9, which encompasses both the prefilter 10 and the main filter 11, is, together with the support lattice 15 and the fastening element 17, preferably made from injection molded plastic, providing a one-piece embodiment of the same material which can be manufactured at an extremely favorable cost. The metal screens 12 and 14 and the frame as well as the lattice can thus be molded to define a single piece. It may also be suitable to manufacture the prefilter 10 adjoining the upper rim portion 20 of the main air filter 11 first as a single part, and in the next working step to form the double filter unit 9 by connecting it directly to the main air filter 11. To this end, the coarse-mesh filter screen 12 of the prefilter 10 can be fastened directly to the rim portion 20 in a simple manner such as with the aid of a plurality of screws which hold the filter screen in place on the rim portion.

As FIG. 2 shows in particular, the frame 13 of the double-filter unit 9 has a stepped portion 21. The stepped portion 21 extends over a peripheral rim 22 of an intermediate plate 23 which is mounted in front of the carburetor 6 and has here air passageways, not shown, through which the filtered air reaches the carburetor 6. As FIG. 2 shows, the double-filter unit 9 rests in a form-tight manner via the frame 13 on the housing 2 of the motor-driven chain saw 1 so that uncleaned air cannot reach the carburetor 6.

The ambient air aspirated by the engine of the motor-driven chain saw 1 first flows through the prefilter 10 into the space 24 existing between the main air filter 11 and the cover 7 whereupon the coarse particles of dirt contained in the aspirated air are already retained on the outside of the prefilter 10. From the space 24, the pre-cleaned air flows through the fine-mesh filter material 14 of the main air filter 11 and reaches the carburetor 6 through air passageways formed in the intermediate plate 23.

A substantial advantage is that in cleaning the double filter unit 9, it is automatically assured that in a single work step both the main air filter 11 and the prefilter 10 are cleaned because both filters are located immediately next to one another and do not have to be cleaned separately as separate parts. To this end, manufacture at a favorable cost and above all simpler handling are attained as compared with known individual filters because by loosening a single fastening screw the entire double filter unit 9 can be mounted or removed with a single manual manipulation.

It is understood that the foregoing description is that of the preferred embodiments of the invention and that various changes and modifications may be made thereto without departing from the spirit and scope of the invention as defined in the appended claims.

What is claimed is:

1. A motor-driven tool equipped with an internal combustion engine such as a portable chain saw or the like, the tool comprising:

a housing for accommodating the engine therein;

a carburetor into which air is aspirated;

a cover mounted on the housing so as to conjointly define a path therewith for the aspirated air and a chamber through which the air passes before it enters the carburetor; and, a single-piece double-filter unit having a prefilter section and a main filter section, said double-filter unit being mounted in said chamber to place said main filter section ahead of said carburetor in such a manner to cause said main filter section and said cover to conjointly define a compartment within said chamber and to place said prefilter section in the path of the aspirated air so as to cause the aspirated air to first pass through said prefilter section into said compartment and then through said main filter section whereupon the aspirated air passes into the carburetor.

2. The tool of claim 1, said double-filter unit comprising: a frame defining said prefilter section and said main filter section; and, a filter material mounted in said frame, said frame being configured at its outer periphery to engage said housing in a form-tight manner.

3. The tool of claim 2, said double-filter unit further comprising attachment means for attaching said double-filter unit to said housing.

4. The tool of claim 3, said frame having a supporting lattice for subdividing the filter material corresponding to said main filter section into a plurality of surface sections.

5. The tool of claim 3, said attachment means being mounted in said lattice so as to be approximately at center region of said main filter section.

6. The tool of claim 2, said frame being configured so as to place said prefilter section above said main filter section.

7. The tool of claim 2, said double-filter unit comprising: a frame having a leg partitioning said frame into a first sub-frame defining said main filter section and a second sub-frame defining said prefilter section, a first filter screen mounted in said first sub-frame and a second filter screen mounted in said second sub-frame, said first filter screen having a mesh defining a plurality of first openings and said second filter screen having a mesh defining a plurality of second openings, said second openings being larger than said first openings.

8. The tool of claim 7, said first sub-frame including a supporting lattice for subdividing said first filter screen into a plurality of surface sections, said frame and said lattice being made of a single piece of plastic.

9. The tool of claim 8, said first filter screen and said second filter screen being molded into said single piece of plastic.

10. The tool of claim 7, comprising a plate mounted between said frame and said carburetor for shielding the latter and having a plurality of apertures formed therein for allowing filtered aspirated air to pass therethrough and into the carburetor.

11. The tool of claim 10, said plate having a peripheral edge and said frame having a step formed thereon for engaging said peripheral edge of said plate.

12. The tool of claim 8, said first sub-frame having an outer periphery defining a plane and said supporting lattice thereof being configured to have a hood-like shape; and, said second filter screen extending approximately in said plane.

13. The tool of claim 7, comprising a handle extending outwardly from said housing, said first sub-frame having a recess formed therein for accommodating a portion of said handle.

* * * * *